US012001168B2

(12) United States Patent
Chang et al.

(10) Patent No.: US 12,001,168 B2
(45) Date of Patent: Jun. 4, 2024

(54) HOLOGRAPHIC PROJECTORS INCLUDING SIZE CORRECTION AND ALIGNMENT OF BEAMS HAVING DIFFERENT WAVELENGTHS OF LIGHT

(71) Applicant: GM GLOBAL TECHNOLOGY OPERATIONS LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 914 days.

(21) Appl. No.: 17/038,356

(22) Filed: Sep. 30, 2020

(65) Prior Publication Data

US 2022/0100147 A1 Mar. 31, 2022

(51) Int. Cl.
*G03H 1/22* (2006.01)
*G02B 27/01* (2006.01)

(52) U.S. Cl.
CPC ....... *G03H 1/2294* (2013.01); *G02B 27/0172* (2013.01); *G03H 1/2249* (2013.01); *G02B 2027/0174* (2013.01); *G02B 2027/0178* (2013.01); *G03H 2001/2271* (2013.01);
(Continued)

(58) Field of Classification Search
CPC ............... G03H 1/2294; G03H 1/2249; G03H 2001/2271; G03H 2222/34; G03H 2223/18; G03H 2223/19; G03H 2001/0825; G03H 1/0808; G03H 2001/2284; G03H 2223/23; G03H 2225/61; G03H 1/2205; G02B 27/0172; G02B 2027/0174; G02B 2027/0178; G02B 5/1809; G02B 5/1814;
(Continued)

(56) References Cited

U.S. PATENT DOCUMENTS 9,618,767 B2 * 4/2017 Egawa .................. G02B 27/48
10,302,937 B2   5/2019 Ferris et al.
10,747,314 B1   8/2020 Chang et al.
(Continued)

FOREIGN PATENT DOCUMENTS

DE  102018221438 A1  6/2020

OTHER PUBLICATIONS

U.S. Appl. No. 16/363,536, filed Mar. 25, 2019, Chang et al.
(Continued)

*Primary Examiner* — Jade R Chwasz

(57) ABSTRACT

A holographic projection system including first, second and third light sources, SLMs, a lens, a combiner and a control module. The first, second and third light sources generate respective light beams. The light beams have respective wavelengths. The SLMs respectively diffract the light beams. The lens is disposed to adjust a divergence angle of one of the light beams, such that diffracted light out of each of the SLMs is at a same diffraction angle. The SLMs encode phase holograms including respective versions of a graphic image based on light generated by the light sources including light output from the lens to provide phase hologram beams. The combiner combines the phase hologram beams to provide a combined phase hologram beam projected for viewing a combined graphic image. The control module encodes a prism hologram on one of the SLMs to align outputs of the SLMs.

19 Claims, 12 Drawing Sheets

(52) U.S. Cl.
CPC ..... *G03H 2222/34* (2013.01); *G03H 2223/18* (2013.01); *G03H 2223/19* (2013.01)

(58) Field of Classification Search
CPC ................ G02B 5/1842; G02B 5/1861; G02B 2027/0116; G02B 27/0103
See application file for complete search history.

(56) References Cited

U.S. PATENT DOCUMENTS

| | | | |
|---|---|---|---|
| 2010/0085276 A1* | 4/2010 | Cable | G03H 1/2294 345/6 |
| 2016/0109701 A1 | 4/2016 | Goldman-Shenhar et al. | |
| 2017/0161949 A1 | 6/2017 | Seder et al. | |
| 2017/0161950 A1 | 6/2017 | Seder et al. | |
| 2018/0120768 A1 | 5/2018 | Christmas | |
| 2018/0374407 A1* | 12/2018 | Furuya | G03B 21/625 |
| 2019/0064738 A1* | 2/2019 | Cole | G03H 1/2205 |
| 2020/0073138 A1 | 3/2020 | Chang | |
| 2020/0073139 A1 | 3/2020 | Chang | |
| 2021/0360209 A1* | 11/2021 | Ma | H04N 9/3126 |
| 2022/0066211 A1* | 3/2022 | Seder | G09G 3/001 |

OTHER PUBLICATIONS

U.S. Appl. No. 16/379,439, filed Apr. 9, 2019, Chang et al.
U.S. Appl. No. 16/418,574, filed May 21, 2019, Chang et al.
U.S. Appl. No. 16/459,994, filed Jul. 2, 2019, Seder et al.
U.S. Appl. No. 16/531,744, filed Aug. 5, 2019, Chang et al.
U.S. Appl. No. 16/531,844, filed Aug. 5, 2019, Chang et al.
U.S. Appl. No. 16/549,606, filed Aug. 23, 2019, Chang et al.
U.S. Appl. No. 16/553,475, filed Aug. 28, 2019, Chang et al.
U.S. Appl. No. 16/560,035, filed Sep. 4, 2019, Chang et al.
U.S. Appl. No. 16/599,777, filed Oct. 11, 2019, Chang et al.
U.S. Appl. No. 16/661,227, filed Oct. 23, 2019, Chang et al.
U.S. Appl. No. 16/676,213, filed Nov. 6, 2019, Harden et al.
U.S. Appl. No. 16/676,769, filed Nov. 7, 2019, Chang et al.
U.S. Appl. No. 16/688,139, filed Nov. 19, 2019, Wells et al.
U.S. Appl. No. 16/696,093, filed Nov. 26, 2019, Wells et al.
U.S. Appl. No. 16/782,856, filed Feb. 5, 2020, Harden, Jr. et al.
U.S. Appl. No. 16/985,377, filed Aug. 5, 2020, Baltax et al.
U.S. Appl. No. 17/004,249, filed Aug. 27, 2020, Seder et al.
Office Action issued in corresponding German Patent Application 10 2021 111 228.1 dated Nov. 20, 2023.

* cited by examiner

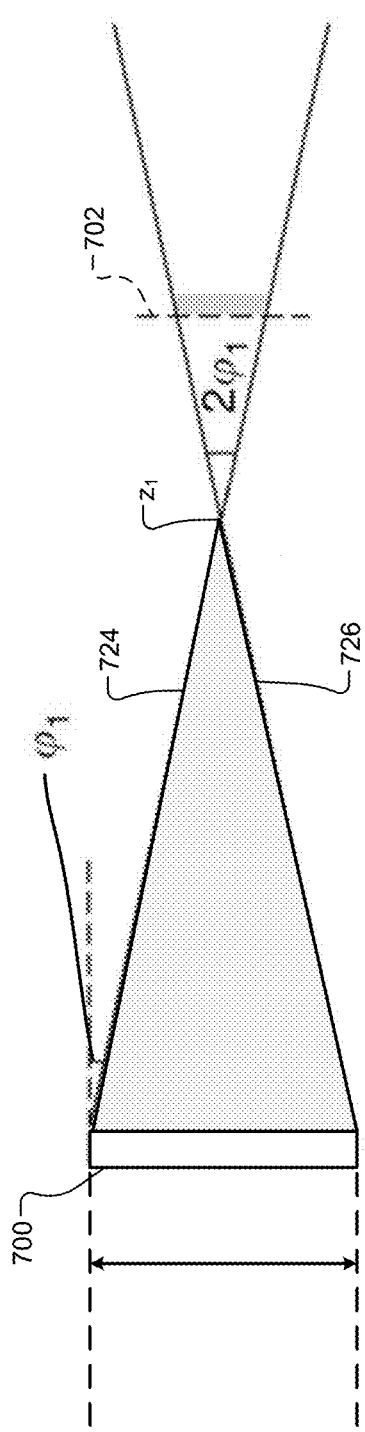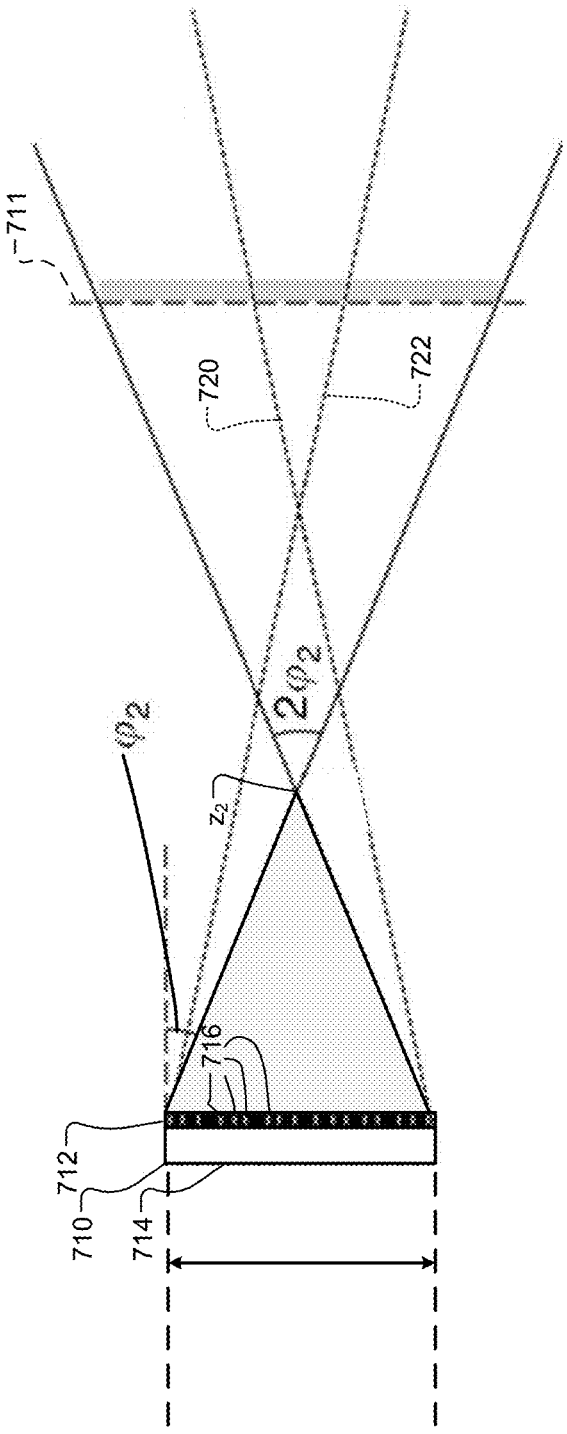
FIG. 7A
FIG. 7B

HOLOGRAPHIC PROJECTORS INCLUDING SIZE CORRECTION AND ALIGNMENT OF BEAMS HAVING DIFFERENT WAVELENGTHS OF LIGHT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to projection holographic display systems and head up display systems of vehicles.

Display devices are used in a variety of applications. Some example display devices are flat panel displays, projection displays, and head-up displays. Display devices can be either be of a transmission or reflection type.

A driver of a vehicle traditionally views surroundings of a vehicle through windows, windshields, and other glass of the vehicle. The driver may control vehicle acceleration, deceleration, and steering based on the driver's visual observation of the surroundings of the vehicle. The vehicle may include one or more displays that display various information to the driver. For example, some vehicles include an infotainment system that includes a display that displays various infotainment and other vehicle information. The vehicle may also include a head-up display (HUD) that displays information by forming a virtual image at a certain distance with reflection of a windshield. For example, the HUD may display a vehicle speed and other vehicle information (e.g., warnings such as lane departure warnings and collision avoidance warnings).

SUMMARY

A holographic projection system including a first light source, a second light source, a third light source, spatial light modulators, a first lens, a combiner and a control module. The first light source is configured to generate a first light beam. The second light source is configured to generate a second light beam. The third light source is configured to generate a third light beam. The first light beam, the second light beam and the third light beam have respective wavelengths. The spatial light modulators are configured to respectively diffract the first light beam, the second light beam and the third light beam. The first lens is disposed to adjust a divergence angle of one of the first light beam, the second light beam or the third light beam, such that diffracted light out of each of the spatial light modulators is at a same diffraction angle. The spatial light modulators are configured to encode phase holograms including respective versions of a graphic image based on light generated by the first light source, the second light source and the third light source including light output from the first lens to provide phase hologram beams. The combiner is configured to combine the phase hologram beams to provide a combined phase hologram beam projected for viewing a combined graphic image. The control module is configured to encode a prism hologram on one of the spatial light modulators to align outputs of the spatial light modulators.

In other features, the first light beam is a red laser beam. The second light beam is a green laser beam. The third light beam is a blue laser beam.

In other features, the holographic projection system further includes a second lens. The first lens adjusts a divergence angle of the green laser beam to match a divergence angle of the red laser beam being diffracted by one of the spatial light modulators. The second lens adjusts a divergence angle of the blue laser beam to match the divergence angle of the red laser beam being diffracted by the one of the spatial light modulators.

In other features, the first lens adjusts a divergence angle of the red laser beam to match a divergence angle of the green laser beam being diffracted by one of the spatial light modulators.

In other features, the holographic projection system is void of a lens to adjust a divergence angle of the blue laser beam.

In other features, one or more of the spatial light modulators includes a non-periodic photon sieve layer to adjust a divergence angle of one or more of the first light beam, the second light beam and the third light beam.

In other features, the control module is configured to encode a lens hologram on one or more of the spatial light modulators to adjust a size of one or more of the first light beam, the second light beam and the third light beam.

In other features, the control module is configured to encode two prism holograms respectively on two of the spatial light modulators to shift position of two of the first light beam, the second light beam and the third light beam.

In other features, the control module is configured to size the first light beam, the second light beam and the third light beam to not fill an available image area and adjust position of one or more of the first light beam, the second light beam and the third light beam to align the first light beam, the second light beam and the third light beam.

In other features, a holographic projection system is provided and includes a first light source, a second light source, a third light source, spatial light modulators, a combiner and a control module. The first light source is configured to generate a first light beam. The second light source is configured to generate a second light beam. The third light source is configured to generate a third light beam, where the first light beam, the second light beam and the third light beam have respective wavelengths. The spatial light modulators are configured to encode phase holograms including respective versions of a graphic image based on light generated by the first light source, the second light source and the third light source to provide phase hologram beams. A first one of the spatial light modulators includes a first non-periodic photon sieve layer. The first non-periodic photon sieve layer is configured to adjust a divergence angle of one of the first light beam, the second light beam or the third light beam such that diffracted light out of each of the spatial light modulators is at a same diffraction angle. The combiner is configured to combine the phase hologram beams to provide a combined phase hologram beam projected for viewing a combined graphic image. The control module is configured to encode a prism hologram on one of the spatial light modulators to align outputs of the spatial light modulators.

In other features, the first one of the spatial light modulators that includes the first non-periodic photon sieve layer is a same spatial light modulator for which the control module encoded the prism hologram.

In other features, the first one of the spatial light modulators that includes the first non-periodic photon sieve layer is a different spatial light modulator for which the control module encoded the prism hologram.

In other features, the first light beam is a red laser beam. The second light beam is a green laser beam. The third light beam is a blue laser beam.

In other features, the first one of the spatial light modulators receives the green laser beam. A second one of the spatial light modulators receives the blue laser beam and includes a second non-periodic photon sieve layer. The first non-periodic photon sieve layer adjusts a divergence angle of the green laser beam to match a divergence angle of the red laser beam being diffracted by a third one of the spatial light modulators. The second non-periodic photon sieve layer adjusts a divergence angle of the blue laser beam to match the divergence angle of the red laser beam being diffracted by the third one of the spatial light modulators.

In other features, the first non-periodic photon sieve layer adjusts a divergence angle of the red laser beam to match a divergence angle of the green laser beam being diffracted by the first one of the spatial light modulators.

In other features, the holographic projection system is void of a non-periodic photon sieve layer to adjust a divergence angle of the blue laser beam.

In other features, a holographic projection system is provided and includes a first light source, a second light source, a third light source, spatial light modulators, and a control module. The first light source is configured to generate a first light beam. The second light source is configured to generate a second light beam. The third light source is configured to generate a third light beam. The first light beam, the second light beam and the third light beam have respective wavelengths. The spatial light modulators are configured to encode phase holograms including a graphic image generated based on a combination of light from the first light beam, the second light beam and the third light beam. The control module is configured to: encode one or more lens holograms on a first one or more of the spatial light modulators to adjust size of one of the first light beam, second light beam, or third light beam relative to another one of the first light beam, second light beam, or third light beam; and encode one or more prism holograms on a second one or more of the spatial light modulators to align the first light beam, the second light beam and the third light beam.

In other features, the holographic projection system further includes a combiner to: combine outputs of three of the spatial light modulators to provide a combined phase hologram beam projected for viewing a combined graphic image; or combine outputs of the first light source, the second light source and the third light source prior to the first light beam, the second light beam and the third light beam being received at the spatial light modulators.

In other features, the spatial light modulators include: a first spatial light modulator; and a second spatial light modulator downstream from the first spatial light modulator. The control module is configured to: encode at least one of a lens hologram or a prism hologram on the first spatial light modulator; and encode the graphic image on the second spatial light modulator.

In other features, the spatial light modulators include: a third spatial light modulator; and a fourth spatial light modulator downstream from the first spatial light modulator. The first spatial light modulator receives the first light beam. The third spatial light modulator receive the second light beam. The control module is configured to: encode at least one of a lens hologram or a prism hologram on the third spatial light modulator; and encode the graphic image on the second spatial light modulator and the fourth spatial light modulator.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7A is an example diagram illustrating diffraction angle and viewing zone size without use of a non-periodic photon sieve;

FIG. 7B is an example diagram illustrating diffraction angle and viewing zone size with use of a non-periodic photon sieve in accordance with the present disclosure;

In the drawings, reference numbers may be reused to identify similar and/or identical elements.

DETAILED DESCRIPTION

A vehicle may include a holographic HUD that includes a SLM and a coherent or partially coherent light source. The phase hologram is encoded on a SLM. Light from a coherent or partially coherent light source illuminates the SLM that is encoded with a phase hologram and the light is diffracted in a manner prescribed by the hologram. The diffracted light is reflected by a windshield of the vehicle and forms a real image on a driver's retina.

Holographic display systems often employ a source of coherent light, such as a laser, in conjunction with the other display components. Coherent light may refer to light that is spatially and temporally in-phase. When coherent light is reflected from a surface, various points on the surface are considered as a secondary light wave. When independent RGB channels are used, such as in a 3-LCoS holographic HUD, it becomes necessary to provide three spatially aligned RGB images at an eye box, otherwise the viewer sees three misaligned images. The eye box may refer to a rectangular planar area in which a viewer is able to see an image.

Figure 1:
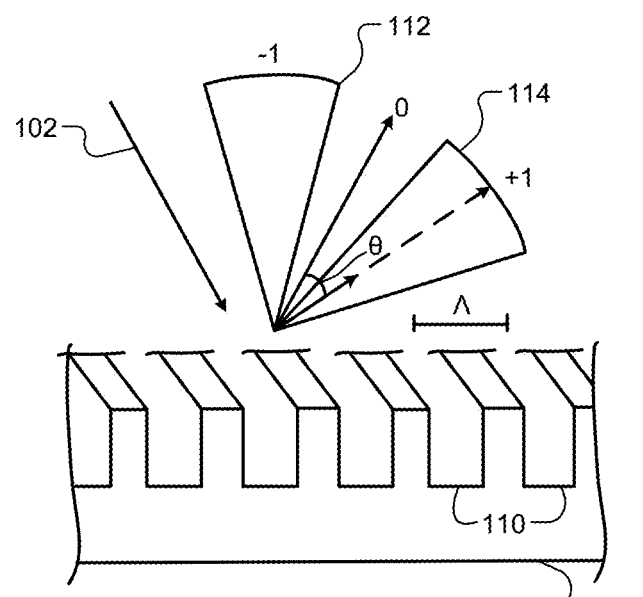
FIG. 1 is an example diagram illustrating a diffraction angle for a spatial light modulator (SLM)
Figure 2:
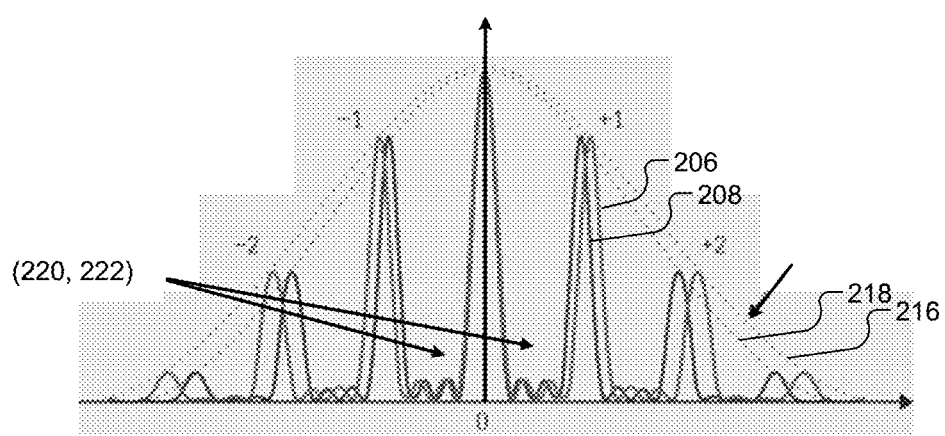
FIG. 2 is an example intensity versus diffraction angle plot illustrating differences in diffraction angles for red and blue light.

FIGS. 1 and 2 show diagrams illustrating a diffraction angle θ for a SLM 100 and intensity versus diffraction angle curves 206, 208 for red and blue light, respectively, for the SLM 100. As shown, an incident beam of light 102 is directed at the SLM 100 and reflects from the SLM 100. Reflection of the incident beam of light 102 provides (i) a center maximum at 0 peaking along a center axis, and (ii) additional decreasing in size maxima that are symmetric about the center axis of the center maximum in a diffraction order. The maxima may be represented by equation 1, where $\Lambda$ is the pitch of the SLM 100, m is an integer, and $\lambda$ is the wavelength of light. The pitch $\Lambda$ refers to a distance between grooves 110 of the SLM 100.

$$\Lambda \sin \theta = m\lambda$$

Resultant diffracted light distribution for different wavelengths RGB depends on wavelength-dependent diffraction angle at the SLM 100 and optical component misalignment of the corresponding holographic projection system. Optical component misalignment may refer to misalignment of any optical components of a holographic projection system. Misalignment can be due to, for example, windshield angle, angles of lenses, angles and/or positions of SLMs, angle of a beam expander, etc. Different reflected spectrums of light associated with the first (−1 and 1) maxima are represented by "pie"-shapes 112, 114. Intensity modulation is represented in FIG. 2 by dotted curves 216, 218 for red and blue light, respectively. First minima 220, 222 are shown between the center maximum and the first maxima.

Figure 3:
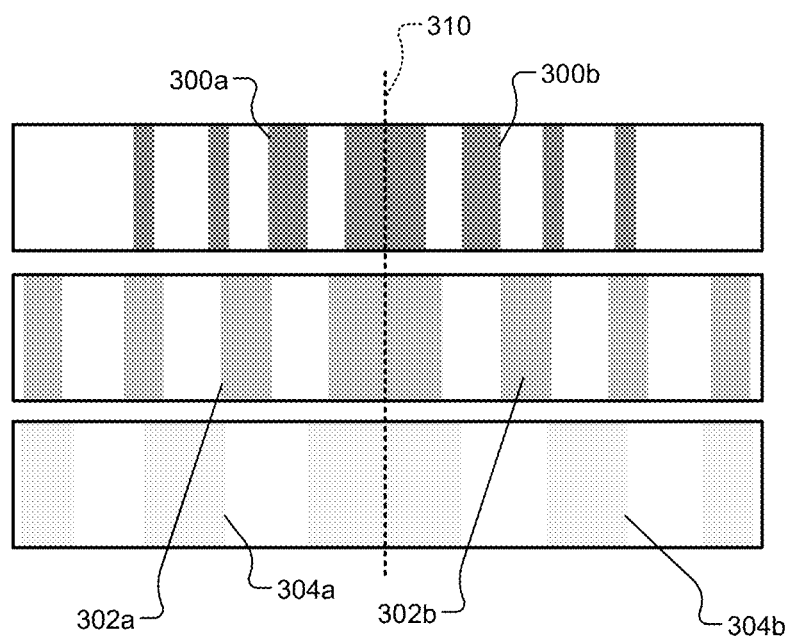
FIG. 3 is an example bar diagram illustrating differences in alignment and sizes of blue, green and red light beams due to different diffraction angles.
Figure 4:
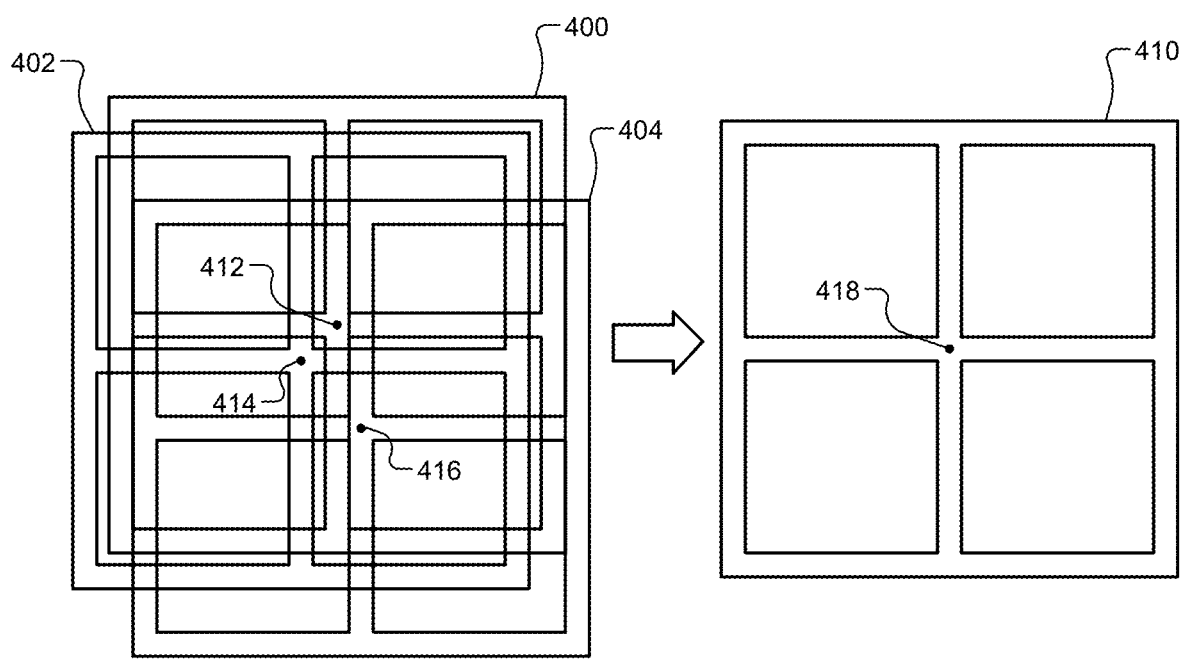
FIG. 4 is an example diagram illustrating misalignment of different red-green-blue (RGB) images due to diffraction angle differences and a resultant image after correction of the misalignment in accordance with the present disclosure.

Image size and location of a holographic display varies with wavelength. This is illustrated in FIGS. 3 and 4. FIG. 3 shows a bar diagram illustrating differences in alignment and sizes of blue, green and red light due to different diffraction angles of the respective colored beams of light. For example, the first stripes 300a, 300b, 302a, 302b, 304a, 304b of the respective blue, green and red light are shown, which are different in location relative to a center axis 310 and are different in width (or size). FIG. 4 shows (i) misalignment of a red image 400, a green image 402, and a blue image 404 due to differences in respective diffraction angles, and (ii) a resultant image 410 after correction of the misalignment using techniques disclosed herein. The resultant image 410 may be a white image provided as a result of combining same size RGB images 400, 402, 404.

In a holographic display system, alignment of three picture generating units of primary colors is challenging. The misalignment may be (i) due to the different diffraction angles of different colored light beams reflected off respective SLMs, (ii) due to misalignment of optical components of the corresponding holographic imaging system, and/or (iii) caused by a diffractive optical expander. The misalignment due to optical components may refer to the SLMs, distances between light beams out of the SLMs and an optical expander, and distances between the optical expander and the viewer's eyes.

In addition, the picture generating hardware of the holographic imaging system controls diffraction of light, which is wavelength dependent. A projected image size is proportional to the diffraction angle of the light of that projected image. The diffraction angle is directly related to the wavelength of the light. If a hologram is illuminated with different wavelengths, a single output image will be seen as three images having different sizes and different locations. The misalignment of different color images and size differences can become more apparent to a viewer when distances between the picture generating hardware and the viewer's eyes increases. The color misalignment issue is minimal for near-eye displays, such as those in virtual reality or augmented reality headsets, where the images are projected near the viewer's eyes. This issues of misalignment and size differences for different colors is exacerbated when holographic system optics are scaled and holograms are projected over large distances before reaching the viewer's eyes, such as in a vehicle, where a HUD is used. Also, the distances between the picture generating hardware and viewer's eyes is different in different vehicles.

The examples disclosed herein correct and account for the color misalignment and image size differences. The examples include projection holographic display systems that adjust sizes and positions of RGB images to provide overlapping same size images. When adjusting size of a monochrome light beam, the divergence angle and/or cross-sectional area of the light beam taken perpendicular to the emission direction of the light beam (or path of the light beam) are adjusted. When adjusting position of a monochrome image and thus position of a corresponding light beam, vertical and/or horizontal position is adjusted relative to an eye box. For example, the image may be moved vertically or horizontally in the image plane at the viewer's eyes. The RGB images are aligned such that the images have a same overlapping center point and are aligned vertically and horizontally to provide a single image, where none of the images overhang any of the other images. An example of this is shown in FIG. 4. Where the images 400, 402, 404 have respective center points 412, 414, 416 overlapping and represented by point 418.

Multiple different examples are provided for eliminating color misalignment. Some of which include diffraction angle matching to achieve image resizing and software prism encoding for spatial alignment. As an example, one of the holographic display systems adjusts RGB laser divergence to compensate for diffraction angle differences using RGB LCoS SLMs to create same size RGB images using solid lens, electrically tunable lens, and/or SLMs with pin hole layers. One or more prism function holograms are then used to adjust alignment of one or more of the RGB images to align the RGB images relative to each other at the eye box. The examples allow for varying virtual image distances to be accounted for to maintain different color image alignment.

Figure 5:
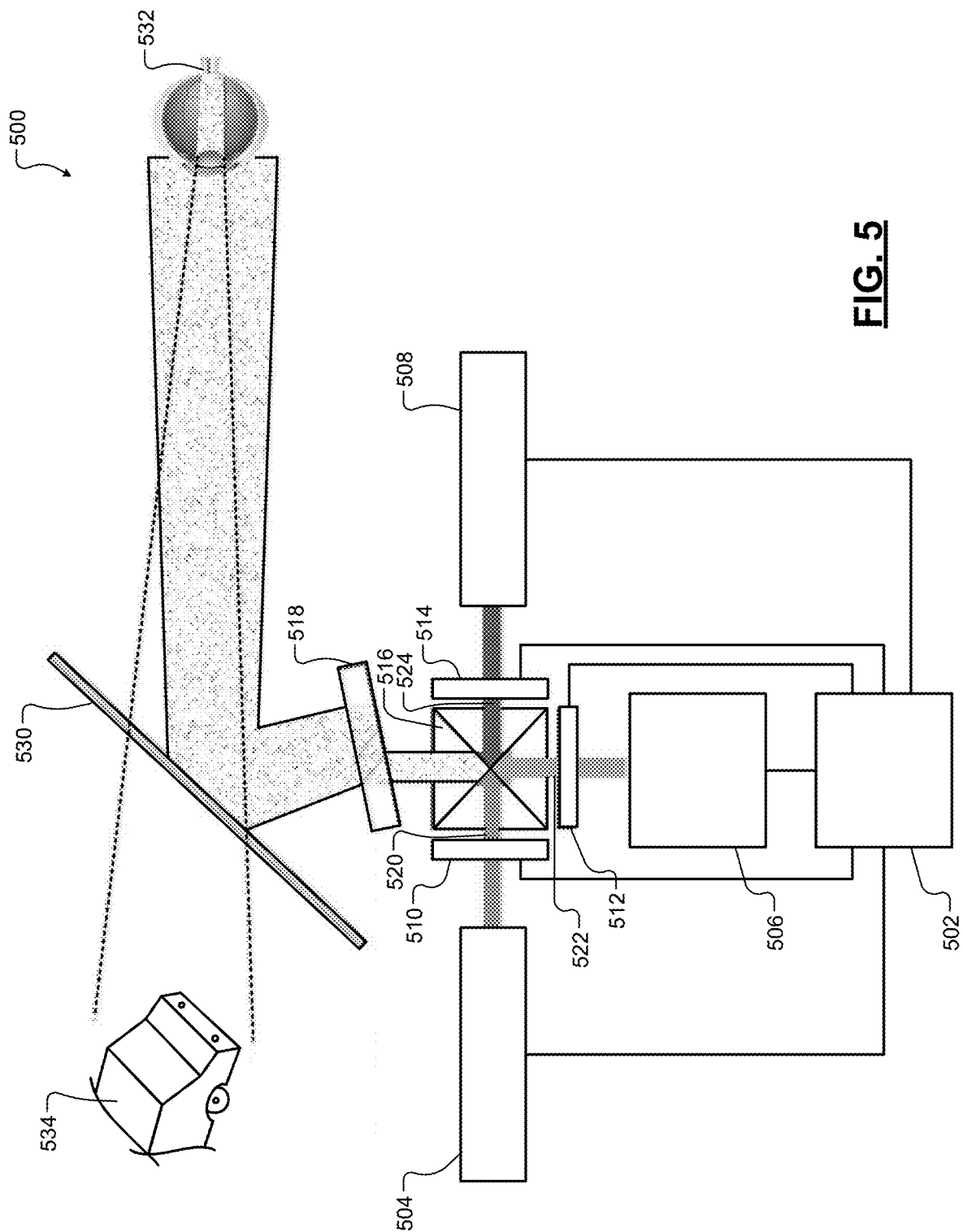
FIG. 5 is a functional block diagram of an example of a holographic projection system including RGB SLMs and an X-cube combiner in accordance with the resent disclosure.

FIG. 5 shows an example of a holographic projection system 500 that includes a control module 502, a red light source 504, a green light source 506, a blue light source 508, RGB SLMs 510, 512, 514, an X-cube combiner 516 and an optical expander 518. The lights sources 502, 504, 506 may be lasers or other suitable light sources. In one embodiment, the RGB SLMs 510, 512, 514 are implemented as LCoS SLMs. Light beams generated by the light sources 502, 504, 506 are provided to the RGB SLMs 510, 512, 514

During operation, the RGB SLMs 510, 512, 514 receive control signals from the control module 502, which provides the phase hologram of the graphic to be projected. Phase hologram beams 520, 522, 524 out of the RGB SLMs 510, 512, 514 are a multiplication of wave fronts and phase holograms of the graphic to be projected in the frequency domain. The outputs of the RGB SLMs 510, 512, 514 are combined by the X-cube combiner 516. The output of the X-cube combiner 516 is provided to the optical expander 518, which expands the beam received from the X-cube combiner 516 prior to being reflected off a windshield 530 and being received at a viewer's retina 532. The viewer perceives an image 534 of an object forward of the windshield 530.

The example of FIG. 5 may be modified to include features described below with respect to FIGS. 6A-8 and/or other disclosed features. The example of FIG. 5 may be modified to include features of more than one of FIGS. 6A-8 and/or other disclosed features.

Figure 6C:
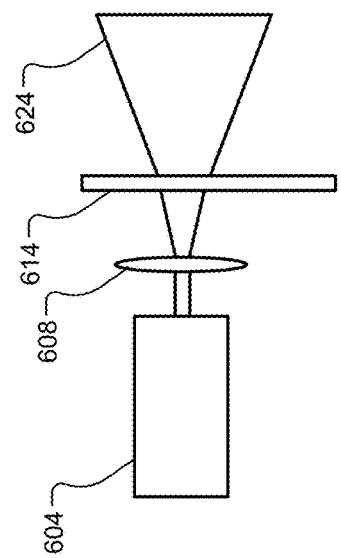
FIG. 6C is a side view of a blue laser, lens and SLM illustrating laser divergence of blue light in accordance with the present disclosure.
Figure 6B:
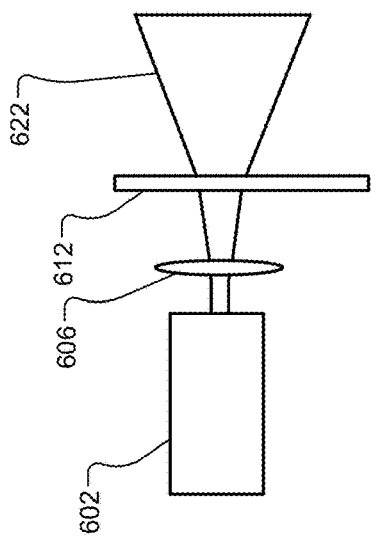
FIG. 6B is a side view of a green laser, lens and SLM illustrating laser divergence of green light in accordance with the present disclosure.
Figure 6A:
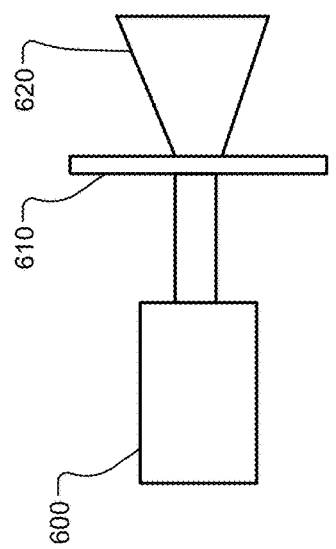
FIG. 6A is a side view of a red laser and SLM illustrating laser divergence of red light in accordance with the present disclosure.

As a first example, FIGS. 6A-C (collectively FIG. 6) shows a red light source 600, green light source 602, and blue light source 604, lenses 606, 608 and SLMs 610, 612, 614. The light sources 600, 602, 604 and SLMs 610, 612, 614 may represent the light sources 504, 506, 508 and RGB SLMs 510, 512, 514 of FIG. 5. In one embodiment, the system 500 of FIG. 5 is modified to include the lenses 606, 608. The system 500 may be modified to include one or more lenses for a corresponding one or more of the light sources 504 (or 600), 506 (or 602), 508 (or 604).

FIG. 6A-6C are provided as an example of implementation for adjusting diffraction angle of light beams to provide resultant light beams 620, 622, 624 of a same size. FIG. 6A shows an example of red light divergence. FIG. 6B shows an example of green light divergence. FIG. 6C shows an example of blue light divergence. The term divergence as used herein refers to beam divergence, which is an angular measure of the increase in beam diameter or radius with distance. Although the lenses 606, 608 are shown as being used for the green and blue light beams, lenses may be included for any of the red, green and blue light beams. The lenses may be solid fixed lenses or electrically tunable lenses. If electrically tunable, the control module 502 of FIG. 5 may be connected to and control states of the lenses. As shown in FIGS. 6B and 6C, the lenses may be disposed between the light sources and the corresponding SLMs. The lenses are included and/or controlled to tune beam divergence and as a result beam size. The lenses change the divergence of the received light beam. In the example shown, lenses are provided for the green and blue light sources to further diverge the output of the light sources to match the divergence of the red light. In this example, to maximize the field of view, the longest of the three wavelengths of the RGB light is red and is designated the baseline (or reference) and compensation components (e.g., lenses and/or SLMs with pin holes layers as described above and/or lens holograms as described below) are applied to the green and blue light beams.

In another embodiment, to minimize the number of compensation components, the center wavelength (green) is selected as the baseline (or reference). Blue is not compensated since the diffraction angle of blue is close to the diffraction angle of green. Compensation components (e.g., a lens and/or a SLM with a pin hole layer as described above and/or a lens hologram as described below) are applied to the red. In an embodiment, a control module, such as one of the control modules disclosed herein, selects the color light source (or wavelength) do use as the baseline and then adjusts divergence angle of one or more of the other light sources.

As an alternative or in addition to use of lenses, one or more of the SLMs 610, 612, 614 may include a pin hole layer (or non-periodic photon sieve) including "pin" holes for widening diffraction of light passing through the SLMs. This is illustrated by FIGS. 7A and 7B. FIG. 7A illustrates a diffraction angle $\varphi_1$ of a SLM 700 and a corresponding viewing zone size at an observation plane 702. The SLM 700 does not include a non-periodic photon sieve (or pin hole layer). FIG. 7B shows a diffraction angle $\varphi_2$ of a SLM 710 and a corresponding viewing zone size at an observation plane 711 with use of a non-periodic photon sieve (or pin hole layer) 712. The pin hole layer 712 is disposed on a base layer 714 and includes pin holes 716 for passage of light. The dashed lines 720, 722 of FIG. 7B correspond with (or match) solid lines 724, 726 of FIG. 7A and are provided to illustrate the differences in divergence and viewing zone size. The focal points for the examples of FIGS. 7A and 7B are designated $z_1$ and $z_2$. The pin holes 716 allow light to pass and diffracts light. Remaining portions of the pin hole layer 712 are absorptive and prevent passage of light. The pin holes 716 change the divergence of the received light.

Figure 8:
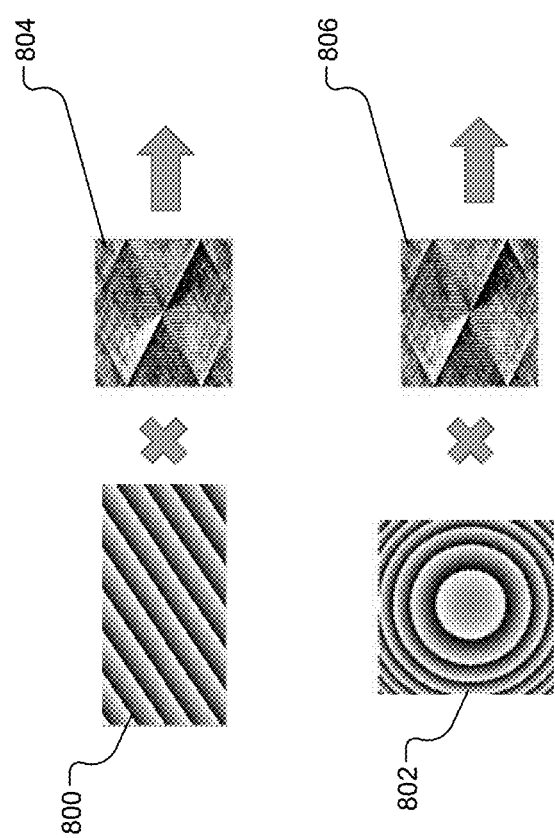
FIG. 8 is an example hologram diagram illustrating introduction of prism and lens holograms via software and SLM(s) for position and size adjustments of RGB images in accordance with the present disclosure.

FIG. 8 illustrates introduction of a prism hologram 800 and a lens hologram 802 via software and one or more SLMs respectively for position and size adjustments of RGB images. The examples of FIG. 8 may be used as an alternative and/or in combination with the examples of described herein including that described above with respect to FIGS. 5-7B. The control module 502 may encode a prism hologram and/or a lens hologram on one or more of the SLMs 510, 512, 514, 610, 612 and 614. This may be in addition to a graphic hologram, such as the graphic holograms 804, 806, which may also be encoded on the one or more of the SLMs 510, 512, 514, 610, 612 and 614 via the control module 502. A prism hologram causes the corresponding image to shift up, down, left, and/or right. A lens hologram changes the size of the image. The prism holograms and lens holograms are in effect multiplied by the graphic holograms as shown to provide a resultant image. Different prism and lens functions may be included to remove and/or compensate for different misalignment and/or position errors.

Figure 9:
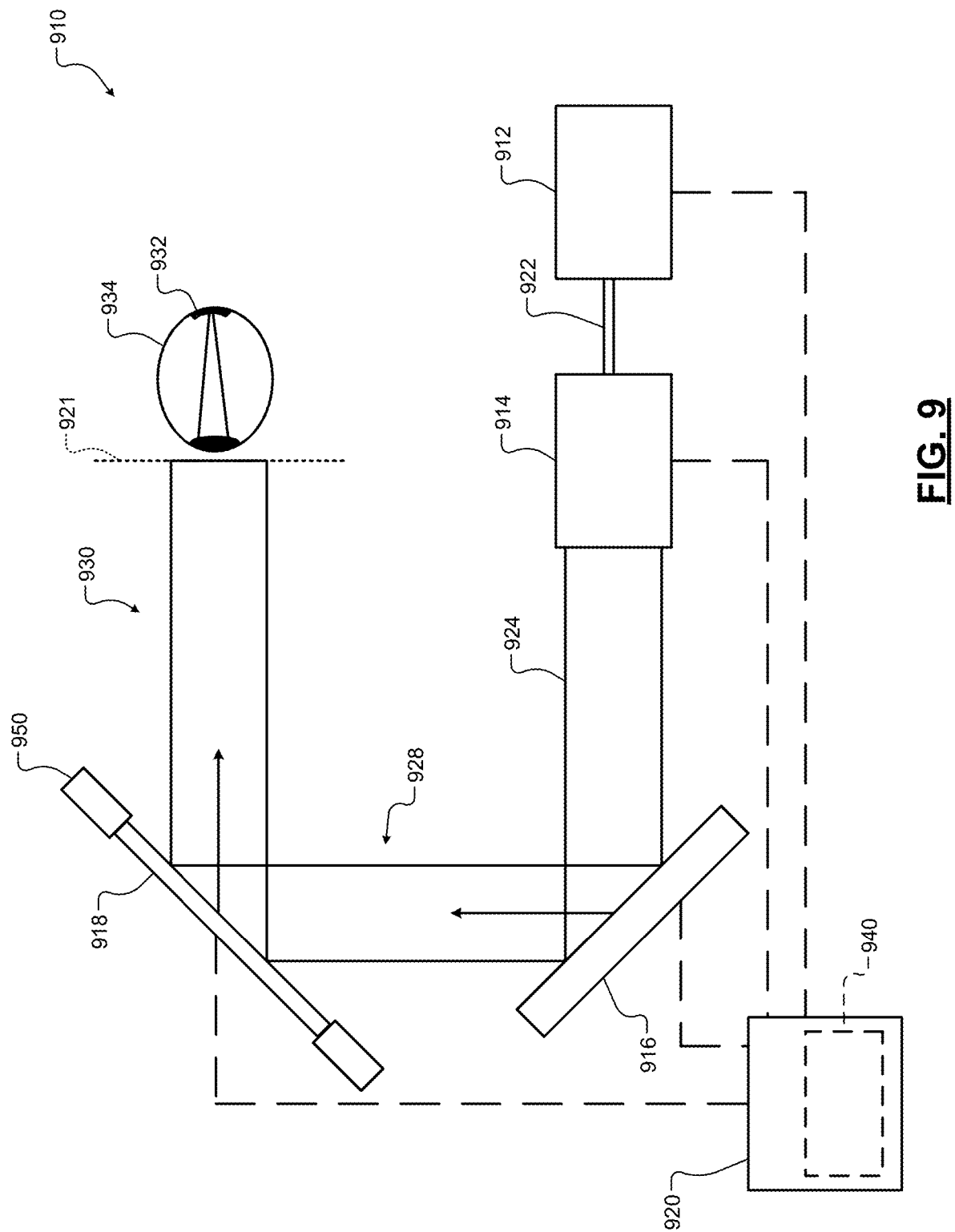
FIG. 9 is a function block diagram of an example of a holographic projection system incorporating dual SLMs and introducing prism and lens holograms and focal plane distance compensation in accordance with the present disclosure.

FIG. 9 shows a holographic projection system 910 that includes one or more light (or laser) sources 912, a beam expander 914, a reflection device 916, a LCoS SLM 918 and a control module 920. The laser 912 generates a laser beam 922, which is received at the beam expander 914. The beam expander 914 expands a width of the laser beam 922 to provide an expanded beam 924. The reflective device 916 receives the expanded beam 924 and provides a reflected expanded beam 928 that is received at the LCoS SLM 918. The SLM 918 is encoded with a graphic hologram via the control module 920 and provides a projected beam 930, which is seen by the retina 932 of a viewer's eye 934. The control module 920 may include display drivers 940 for controlling states of the reflective device 916 and/or the LCoS SLM 918. The LCoS SLM 118 may include a limiting aperture 950 to mitigate stray light. The limiting aperture 950 may be implemented as a frame holding the LCoS SLM 918.

The reflection device 916 may be a reflective-SLM or a micro-mirror array. When a SLM, the reflection device 916 is used to adjust divergence angle of the light source 912 and/or image size. In one embodiment, the reflective device (or SLM) 916 is used for fine tuning of beam size and position. This includes using the reflective device 916 to (i) adjust the divergence angle of the light beam with a lens hologram encoded on the reflective device 916 by the control module 920, (ii) shift (up, down, left and/or right) a projected graphic with a prism hologram encoded on the reflective device 916 by the control module 920, and/or (iii) compensate for focal plane difference induced by software lens phase hologram encoding. An example focal plane 921 is shown. The reflective device 916 reflects and diffracts the received expanded light beam at the LCoS SLM 918.

In one embodiment, the reflective devices provided for each RGB light beam may be provided with a lens function to maintain proper (same) sizes of the RGB light beams. The lens functions may be used to compensate for virtual image distance to maintain same focal plane at viewer's eyes. The compensation may be provided for size errors occurring at the LCoS SLMs downstream from the reflective devices. The LCoS SLMs may have different focal planes and the lens functions implemented at the reflective devices may be used to adjust the focal planes to be at the same location relative to a viewer's eyes and/or reference plane.

In one embodiment, the configuration of FIG. 9 may be implemented for each of three RGB light sources, where divergence and position are independently controlled for each of the three light sources. In this example, three light sources (red, green, and blue light sources) are provided as shown in FIGS. 5 and 6 SLMs are included. A pair of SLMs is provided for each light source. Each pair of SLMs includes a first SLM (a reflective device) similar to the reflective device 916 and a second SLM similar to the SLM 918. The second SLMs in the pairs may be LCoS SLMs and the outputs of which may be provided to a X-cube combiner, such as that shown in FIG. 5.

The number of SLMs included depends on the speeds of the SLMs. In one embodiment, 6 SLMs are included. In another embodiment, 4 SLMs are included. In yet another embodiment, 2 SLMs are included. In the 4 SLM embodiment, the shown configuration is used for one light source and another version of the same configuration is used for two light sources, where outputs of the two light sources are provided to the same beam expander via, for example, a combiner. In the 2 SLM embodiment, a single version of the shown configuration is used for all three light sources, where outputs of the three light sources are provided to the same beam expander, via for example, a combiner.

Figure 10:
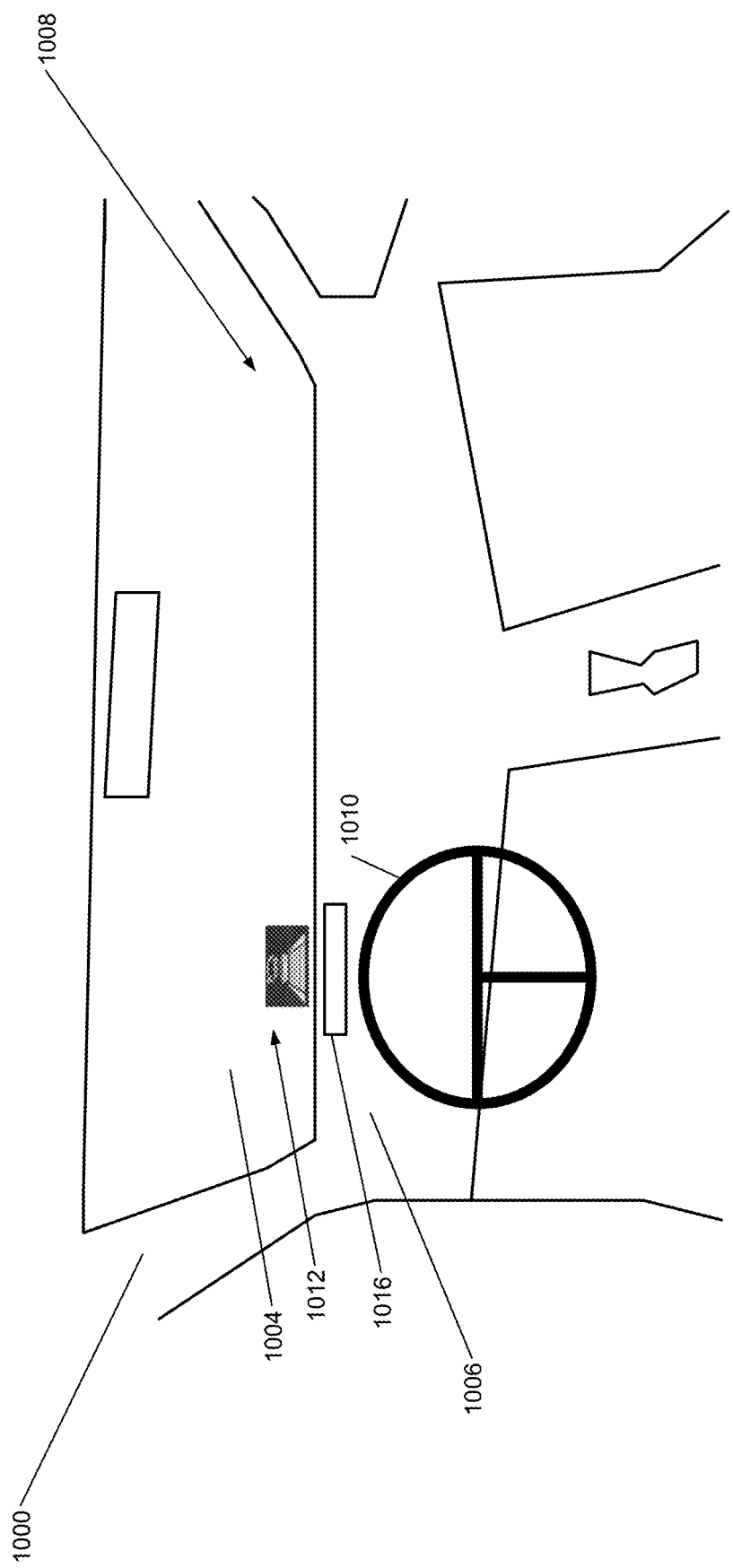
FIG. 10 is a perspective view of an example interior of a vehicle including a HUD.

FIG. 10 shows an example perspective view from a driver seat of a vehicle 1000. The vehicle 1000 includes a windshield 1004 located in a front opening of the vehicle 1000. Passengers within a passenger cabin 1008 of the vehicle 1000 can look through the windshield 1004 to see in front of the vehicle 1000. While the example of a land-based vehicle is described, the present application is also applicable to air-based vehicles (e.g., airplanes, helicopters, etc.) and water-based vehicles (e.g., boats, etc.). Also, although some examples are disclosed herein with respect to vehicle implementations, the examples are applicable to non-vehicle implementations.

As shown in FIG. 10, the windshield 1004 is visually located above a dashboard 1006 of the vehicle 1000. The vehicle 1000 may include a steering wheel 1010. The vehicle 1000 may be an autonomous vehicle, a semi-autonomous vehicle, or a non-autonomous vehicle.

A HUD system, such as that described above with respect to FIGS. 5-9, projects a hologram 1012 shown in FIG. 10 onto a portion of the windshield 1004 through an aperture 1016 in the dashboard 1006. The hologram 1012 includes various vehicle information, such as a present speed of the vehicle 1000, a present gear of a transmission of the vehicle 1000, an engine speed, a directional heading of the vehicle 1000, present infotainment system settings, and/or other vehicle information. The hologram 1012 presents data to the driver of the vehicle without the driver having to look away from objects in front of the vehicle. As discussed further below, the hologram 1012 includes different color overlapping images that are the same size and spatially aligned to provide a single image seen by the viewer as described herein.

Figure 11:
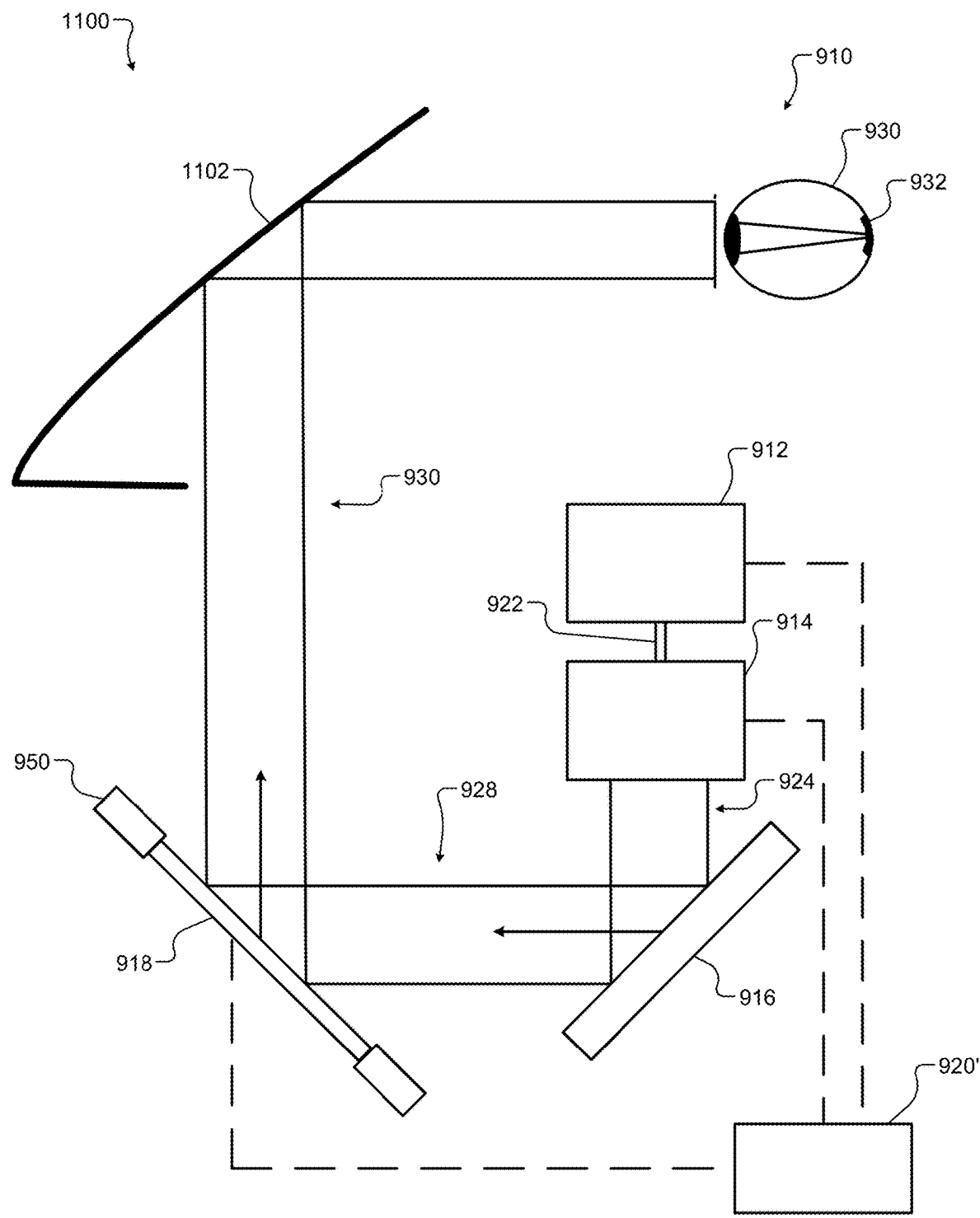
FIG. 11 is a functional block diagram of an example implementation of the holographic projection system of FIG. 9.

FIG. 11 shows a HUD system 1100 that includes a reflector 1102 of a vehicle and the holographic projection system 910 of FIG. 9 with a modified version of the control module 920 (identified as control module 920'). In the example shown, the reflector is implemented as a windshield, but may be a different reflector. The control module 920' may perform the operations described above and additional operations, such as determining vehicle information to display via the reflector (or windshield 1102). The holographic projection system 910 includes one or more light sources (one laser 912 is shown), the beam expander 914, the reflective device 916, the LCoS SLM 918 and the control module 920'. The laser 912 generates a laser beam 922, which is received at the beam expander 914. The beam expander 914 expands a width of the laser beam 922 to provide an expanded beam 924. The reflective device 916 reflects the expanded beam 924 to provide the beam 928, which is received at the LCoS SLM 918. The LCoS SLM 918 provides the projected beam 930.

The control module 920' may include the one or more display drivers 940 of FIG. 9. The display drivers 940 may be used to control states of the reflective device 916 and/or the LCoS SLM 118. The display drivers 940 may be implemented at the control module 920' and/or at the switching SLM 916 and/or the LCoS SLM 918. The LCoS SLM 918 may include a limiting aperture 950 to mitigate stray light. The limiting aperture 950 may be implemented as a frame holding the LCoS SLM 918.

Figure 12:
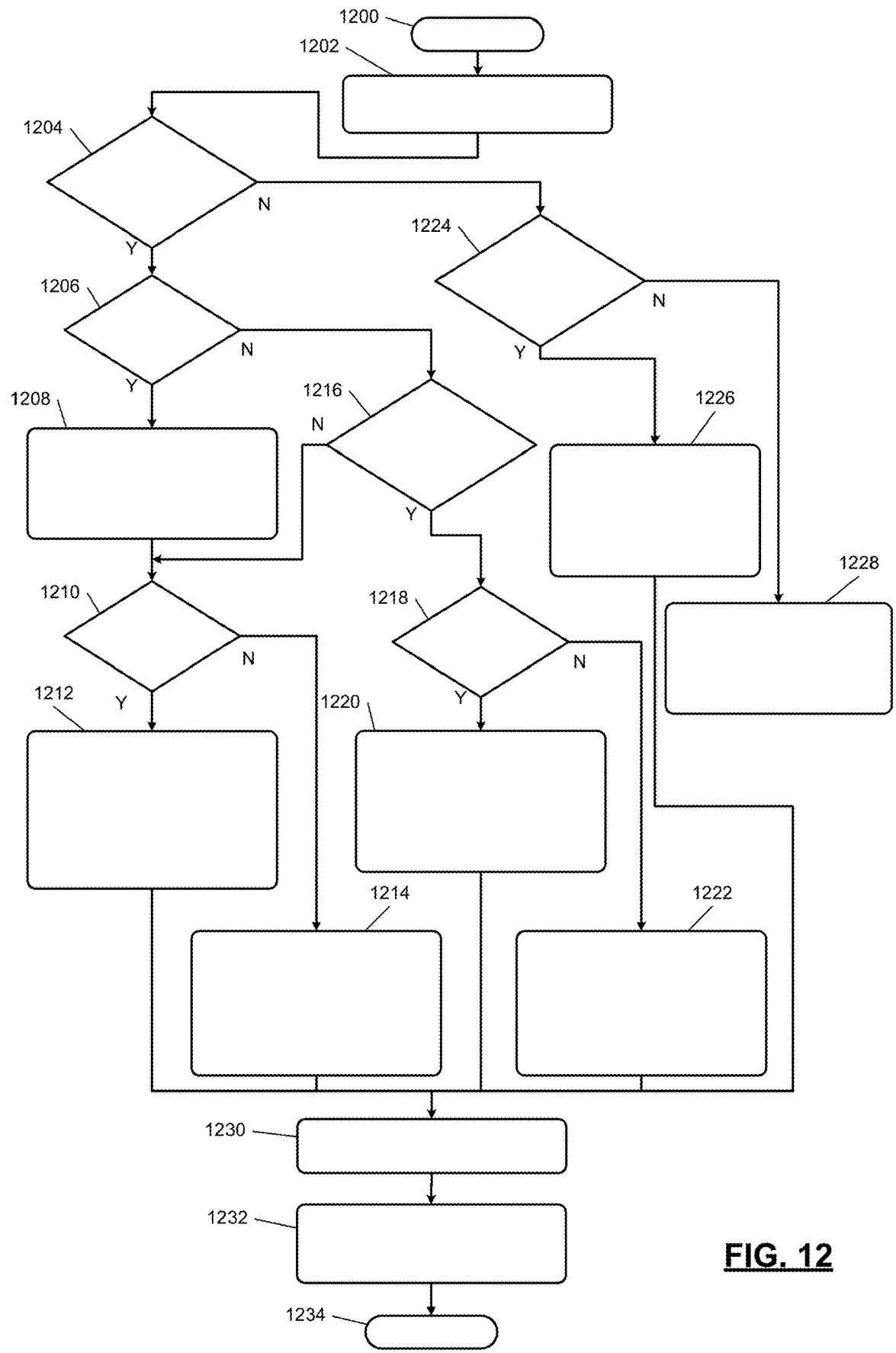
FIG. 12 illustrates an example holographic projection method in accordance with the present disclosure.

FIG. 12 shows a holographic projection method, which may be implemented by the holographic projection systems disclosed above and one of the corresponding control modules. Although the following operations are primarily described with respect to the implementations of FIGS. 5-9, the operations may be easily modified to apply to other implementations of the present disclosure. The operations are provided as examples, one or more of the operations may not be performed and/or skipped. The operations may be iteratively performed.

The method may begin at 1200. At 1202, a control module (e.g., one of the control modules 502, 920, 920') activates RGB light sources to generate RGB light (or laser) beams. The light beams may be directed to lenses, SLMs, a beam (or optical) expander as shown above.

At 1204, the control module may determine whether a single SLM is included for each of the RGB light sources. If yes, operation 1206 may be performed, otherwise operation 1224 may be performed.

At 1206, the control module may determine whether to adjust sizes of one or more of the generated light beams with one or more lenses, as described above. If yes, operation 1208 may be performed, otherwise operation 1216 may be performed. At 1208, the control module may adjust divergence angle of one or more of the RGB light beams via one or more lenses as described above.

At 1210, the control module may determine whether to adjust size of one or more of the RGB light beams via one or more SLMs. This may be done at one or more of any of the SLMS, LCoS SLMs and/or reflective devices referred to above. If yes, operation 1212 may be performed, otherwise operation 1214 may be performed.

At 1212, the control module may adjust (i) sizes of one or more of the RGB light beams with one or more lens holograms, and (ii) positions of one or more of the RGB light beams with one or more prism holograms. The one or more of the RGB light beams that are size adjusted may be the same or different than the one or more of the RGB light beams for which the positions are adjusted. The positions may be adjusted relative to a reference (e.g., a reference point) and/or relative to one or more of the other RGB light beams that are not position adjusted.

At 1214, the control module may adjust positions of one or more of the RGB light beams with one or more prism holograms. The positions may be adjusted relative to a reference (e.g., a reference point) and/or relative to one or more of the other RGB light beams that are not position adjusted.

At 1216, the control module may determine whether size is to be adjusted using a pin hole layer of a SLM, as described above. If yes, operation 1218 is performed, otherwise operation 1210 may be performed.

At 1218, the control module may determine whether size is to be adjusted via a SLM. If yes, operation 1220 may be performed, otherwise operation 1222 may be performed. This may be done at one or more of any of the SLMS, LCoS SLMs and/or reflective devices referred to above. If yes, operation 1220 may be performed, otherwise operation 1222 may be performed.

At 1220, the control module may adjust (i) divergence angle of one or more of the RGB light beams via one or more pin hole layers of respective SLMs for one or more respective RGB light beams, and (ii) adjust size of one or more of the RGB light beams via one or more respective lens holograms.

At 1222, the control module may adjust divergence angle of one or more of the RGB light beams via one or more pin hole layers of respective SLMs for one or more respective RGB light beams.

At 1224, the control module may determine whether a dual SLM is used for each of the RGB light sources, such as in the examples described above with respect to FIGS. 9 and 11. If yes, operation 1226 may be performed, otherwise operation 1228 may be performed.

At 1226, the control module may adjust size(s) of one or more of the RGB light beams with one or more respective lens holograms and position(s) of the one or more RGB light beams via one or more respective prism holograms at the first SLMs (e.g., at the reflective devices 916). Although not shown in FIG. 12, an additional lens and/or prism hologram may be encoded on the second SLM subsequent to operation 1226.

At 1228, the control module may proceed to operation 1206 for single SLM paths and to operation 1226 for dual SLM paths. Operation 1230 may be performed subsequent to operations 1212, 1214, 1220, 1222, and 1226.

At 1230, the control module controls operation of the one or more LCoS SLMs to display the phase hologram of a graphic to be projected. Operation 1230 may be performed while performing operation 1212 and/or operation 1220. Each of the LCoS SLMs, encoded with a phase hologram of a graphic, is illuminated with a corresponding expanded laser beam and generates an encoded phase hologram beam. If more than one beam is projected, the projected beams may be combined via a combiner. This may occur prior to operation 1232. One or more of the display drivers 940 may be used to generate driving voltages to control states of the one or more LCoS SLMs.

At 1232, RGB instances of the encoded phase holograms may be directed at the eyes of the viewer, such that the viewer sees a single graphic image. The phase holograms may be generated based on signals from a vehicle control module. The control module may be implemented as a vehicle control module or may be in communication with a vehicle control module. The control module generates the phase holograms based on vehicle data. The control module may obtain the vehicle data, for example, from a communication bus of the vehicle. The vehicle data may include, for example, the present speed of the vehicle, the present gear of the transmission of the vehicle, the present engine speed, the present directional heading of the vehicle, the present infotainment system settings, and/or the other vehicle information. The method may end at 1234.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The examples disclosed herein provide display assembly flexibility allowing for imprecise alignment of optical components and accommodating wavelength dependent optical properties of the components. The imprecise alignment is compensated for by adjust sizes and positions of RGB light beams. The examples eliminate color misalignment associated with images from independent RGB color channels not being precisely overlapped in an eye box of a HUD. The examples achieve image size matching by resizing RGB graphic images through selection and adjustment of divergence angles of one or more RGB light beams to compensate for the wavelength dependent difference for diffraction angle compensation. An encoding software lens (e.g., a prism hologram) may be used for each of one or more of RGB graphic holograms to spatial align size-matched images at the HUD eye box.

The control modules disclosed herein may include graphics software to generate the image graphics via the LCoS SLMs to align images at the HUD eye box. This may be done at, for example, at the LCoS SLMs that are encoded with graphic holograms and include using a reduced set of pixels or available image area for the corresponding light beams generated. For example, a light beam may be projected to a portion of an available image area and then position of the light beam may then be moved within the available image area. This may be done for one or more of the RGB light beams.

Figure 13:
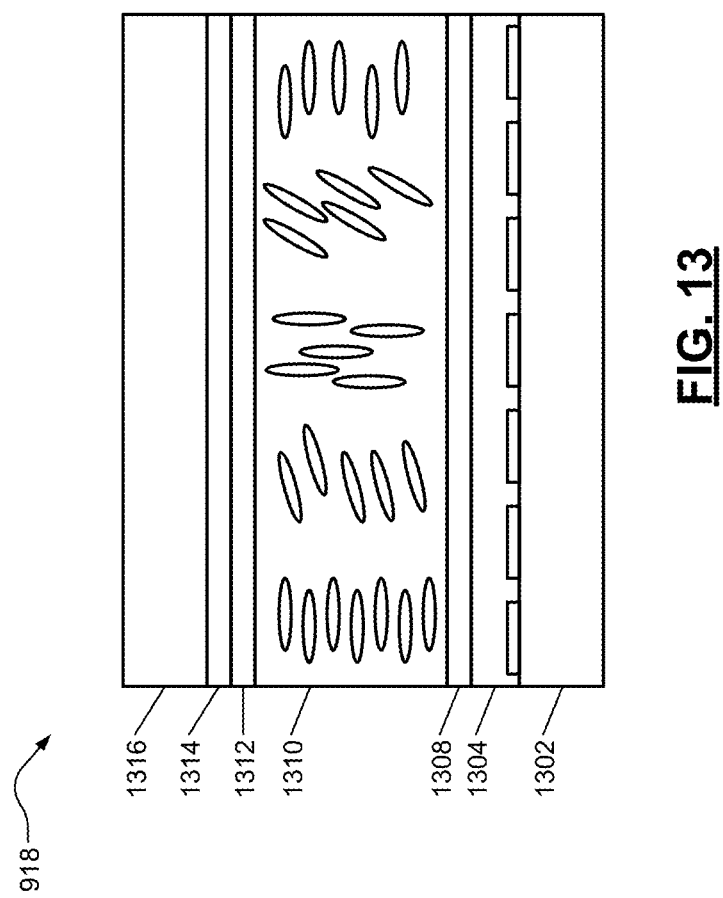
FIG. 13 is a cross-sectional view of an example of a liquid crystal on silicon (LCoS) SLM in accordance with the present disclosure.

FIG. 13 shows an example of the LCoS SLM 918 of FIG. 9. The LCoS SLM 918 may be used in any of the embodiments disclosed herein. The LCoS SLM 918 may include a silicon backplane layer 1302; a LCoS SLM (or phase modulator) layer including a circuit (or pixelized electrode) layer 1304, a first alignment layer 1308, a liquid crystal layer 1310, a second alignment layer 1312, and a transparent electrode layer 1314; and a glass substrate layer 1316.

The circuit layer 1304 includes control circuitry and/or pixel drivers for controlling the liquid crystal layer 1310. The circuit layer 1304 may include a transistor for each pixel. Each pixel independently modulates phase of light exiting the LCoS SLM. As an example, if voltages provided to the pixels are different, then phases of light rays out of corresponding portions of the LCoS SLM have different phases. Each of the pixels may have an associated voltage set. The range of the voltages provided to each pixel may vary the phase of the corresponding portion of the phase hologram beam 930 between, for example, 0-2π to advance or delay the corresponding portion of the light wave coming out of the LCoS SLM 918.

The circuit layer 1304 controls the amount and phase of light emitted from the liquid crystal layer 1310. Orientations of molecules in the liquid crystal layer 1310 and associated with the pixels of the LCoS SLM 918 change with voltage. The voltage-dependent orientation of molecules induces spatially varying phase distribution on LCoS SLM 918. The relation between the amount of phase being modulated and applied voltage can be positive related or negative related, depending on the physical property of liquid crystals. The LCoS SLM layer is further described with respect to FIG. 14. The LCoS SLM 918 may include a reflective film layer when implemented as a reflective holographic projector.

Figure 14:
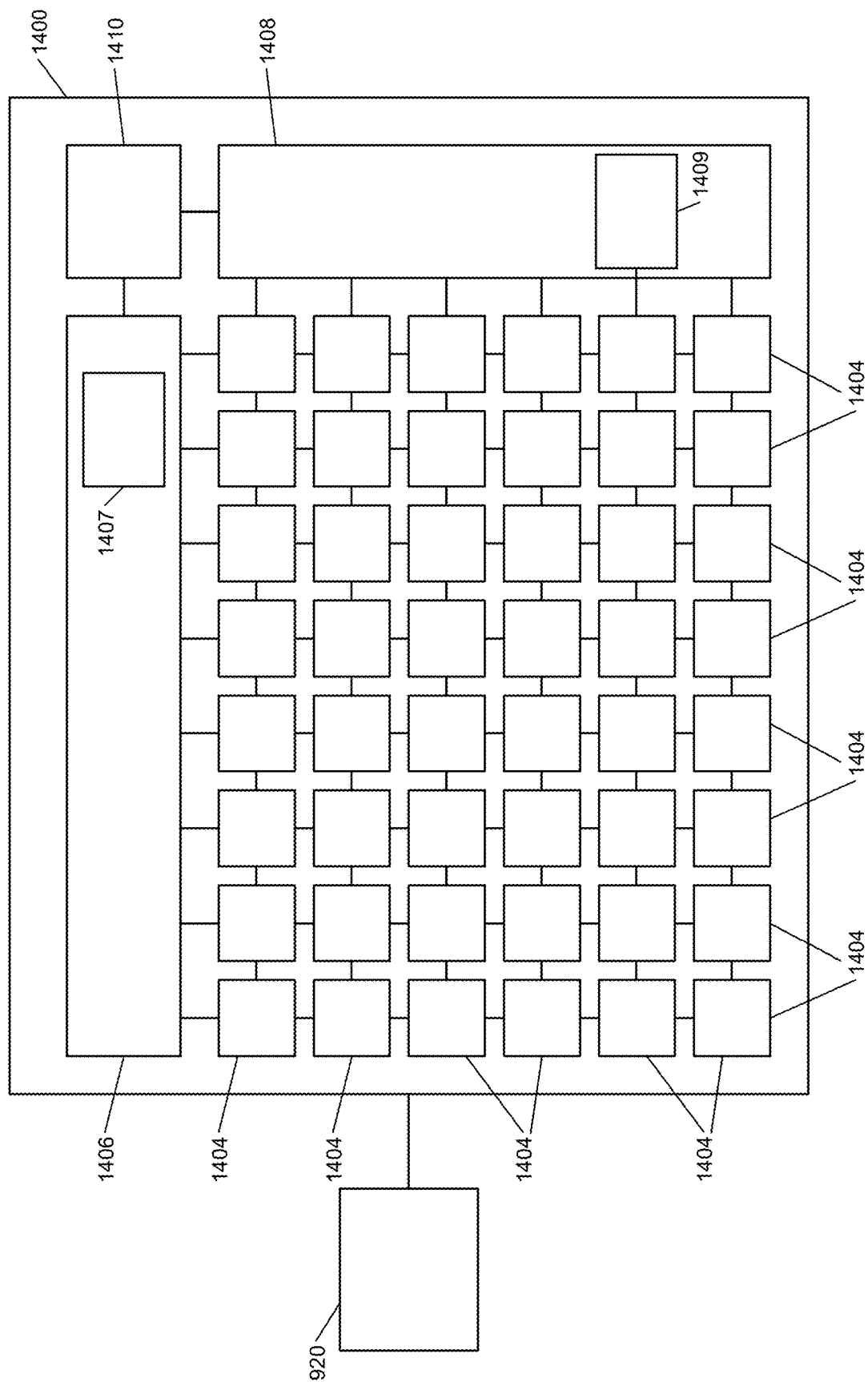
FIG. 14 is a functional block diagram of an example of a portion of a LCoS SLM and a control module in accordance with the present disclosure.

FIG. 14 shows a portion 1400 of a LCoS SLM layer and the control module 920, which may be implemented in the embodiments of FIG. 9. The LCoS SLM layer may include pixels 1404 arranged in an array and connected to drive circuits 1406, 1408. The LCoS SLM layer may also include a SLM control module 1410, which may control the driver circuits 1406 and 1408. The driver circuits 1406, 1408 may receive power from the SLM control module 1410 or the control module 920 via switches 1407, 1409. The SLM control module 1410 may receive signals directly from wave front sensors and/or control signals from the control module 920. The control module 920 may receive phase detection signals and control operation of the SLM control module 1410 to adjust voltages provided to the pixels 1404. In another embodiment, the SLM control module 1410 directly receives the phase detection signals and controls the drive circuits 1406, 1408 to generate the appropriate voltages, which are applied at the pixels 1404.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

What is claimed is:

1. A holographic projection system comprising:
   a first light source configured to generate a first light beam;
   a second light source configured to generate a second light beam;
   a third light source configured to generate a third light beam, wherein the first light beam, the second light beam and the third light beam have respective wavelengths;
   a plurality of spatial light modulators configured to respectively diffract the first light beam, the second light beam and the third light beam;
   a first lens disposed to adjust a divergence angle of one of the first light beam, the second light beam or the third light beam, such that diffracted light out of each of the plurality of spatial light modulators is at a same diffraction angle, wherein the first lens adjusts the divergence angle of the one of the first light beam, the second light beam and the third light beam prior to being received at one of the plurality of spatial light modulators, and
   wherein the plurality of spatial light modulators are configured to encode phase holograms including respective versions of a graphic image based on light generated by the first light source, the second light source and the third light source including light output from the first lens to provide phase hologram beams;
   a combiner configured to combine the phase hologram beams to provide a combined phase hologram beam projected for viewing a combined graphic image; and
   a control module configured to encode a prism hologram on one of the plurality of spatial light modulators to align outputs of the plurality of spatial light modulators.

2. The holographic projection system of claim 1, wherein:
the first light beam is a red laser beam;
the second light beam is a green laser beam; and
the third light beam is a blue laser beam.

3. The holographic projection system of claim 2, further comprising a second lens, wherein:
the first lens adjusts a divergence angle of the green laser beam to match a divergence angle of the red laser beam being diffracted by one of the plurality of spatial light modulators; and
the second lens adjusts a divergence angle of the blue laser beam to match the divergence angle of the red laser beam being diffracted by the one of the plurality of spatial light modulators.

4. The holographic projection system of claim 2, wherein the first lens adjusts a divergence angle of the red laser beam to match a divergence angle of the green laser beam being diffracted by one of the plurality of spatial light modulators.

5. The holographic projection system of claim 4, wherein the holographic projection system is void of a lens to adjust a divergence angle of the blue laser beam.

6. The holographic projection system of claim 1, wherein one or more of the plurality of spatial light modulators comprises a non-periodic photon sieve layer to adjust a divergence angle of one or more of the first light beam, the second light beam and the third light beam.

7. The holographic projection system of claim 1, wherein the control module is configured to encode a lens hologram on one or more of the plurality of spatial light modulators to adjust a size of one or more of the first light beam, the second light beam and the third light beam.

8. The holographic projection system of claim 1, wherein the control module is configured to encode two prism holograms respectively on two of the plurality of spatial light modulators to shift position of two of the first light beam, the second light beam and the third light beam.

9. The holographic projection system of claim 1, wherein the control module is configured to size the first light beam, the second light beam and the third light beam to not fill an available image area and adjust position of one or more of the first light beam, the second light beam and the third light beam to align the first light beam, the second light beam and the third light beam.

10. A holographic projection system comprising:
a first light source configured to generate a first light beam;
a second light source configured to generate a second light beam;
a third light source configured to generate a third light beam, wherein the first light beam, the second light beam and the third light beam have respective wavelengths;
a plurality of spatial light modulators configured to encode phase holograms including respective versions of a graphic image based on light generated by the first light source, the second light source and the third light source to provide phase hologram beams, wherein a first one of the spatial light modulators comprises a first non-periodic photon sieve layer, and wherein the first non-periodic photon sieve layer is configured to adjust a divergence angle of one of the first light beam, the second light beam or the third light beam such that diffracted light out of each of the plurality of spatial light modulators is at a same diffraction angle;
a combiner configured to combine the phase hologram beams to provide a combined phase hologram beam projected for viewing a combined graphic image; and
a control module configured to encode a prism hologram on one of the plurality of spatial light modulators to align outputs of the plurality of spatial light modulators.

11. The holographic projection system of claim 10, wherein the first one of the plurality of spatial light modulators that includes the first non-periodic photon sieve layer is a same spatial light modulator for which the control module encoded the prism hologram.

12. The holographic projection system of claim 10, wherein the first one of the plurality of spatial light modulators that includes the first non-periodic photon sieve layer is a different spatial light modulator for which the control module encoded the prism hologram.

13. The holographic projection system of claim 10, wherein:
the first light beam is a red laser beam;
the second light beam is a green laser beam;
the third light beam is a blue laser beam;
the first one of the plurality of spatial light modulators receives the green laser beam;
a second one of the plurality of spatial light modulators receives the blue laser beam and comprises a second non-periodic photon sieve layer;
the first non-periodic photon sieve layer adjusts a divergence angle of the green laser beam to match a divergence angle of the red laser beam being diffracted by a third one of the plurality of spatial light modulators; and
the second non-periodic photon sieve layer adjusts a divergence angle of the blue laser beam to match the divergence angle of the red laser beam being diffracted by the third one of the plurality of spatial light modulators.

14. The holographic projection system of claim 10, wherein:
the first light beam is a red laser beam;
the second light beam is a green laser beam;
the third light beam is a blue laser beam; and
the first non-periodic photon sieve layer adjusts a divergence angle of the red laser beam to match a divergence angle of the green laser beam being diffracted by the first one of the plurality of spatial light modulators.

15. The holographic projection system of claim 14, wherein the holographic projection system is void of a non-periodic photon sieve layer to adjust a divergence angle of the blue laser beam.

16. A holographic projection system comprising:
a first light source configured to generate a first light beam;
a second light source configured to generate a second light beam;
a third light source configured to generate a third light beam, wherein the first light beam, the second light beam and the third light beam have respective wavelengths;
a plurality of spatial light modulators configured to encode phase holograms including a graphic image generated based on a combination of light from the first light beam, the second light beam and the third light beam;
a control module configured to
encode one or more lens holograms on a first one or more of the plurality of spatial light modulators to adjust size of one of the first light beam, second light beam, or third light beam relative to another one of the first light beam, second light beam, or third light beam, and encode one or more prism holograms on a second one or more of the plurality of spatial light modulators to align the first light beam, the second light beam and the third light beam; and a first lens disposed to adjust a divergence angle of one of the first light beam, the second light beam or the third light beam, such that diffracted light out of each of the plurality of spatial light modulators is at a same diffraction angle, wherein the first lens adjusts the divergence angle of the one of the first light beam, the second light beam and the third light beam prior to being received at one of the plurality of spatial light modulators.

17. The holographic projection system of claim 16, further comprising a combiner to:

combine outputs of three of the plurality of spatial light modulators to provide a combined phase hologram beam projected for viewing a combined graphic image; or combine outputs of the first light source, the second light source and the third light source prior to the first light beam, the second light beam and the third light beam being received at the plurality of spatial light modulators.

18. The holographic projection system of claim 16, wherein the plurality of spatial light modulators comprise:

a first spatial light modulator; and a second spatial light modulator downstream from the first spatial light modulator, wherein the control module is configured to encode at least one of a lens hologram or a prism hologram on the first spatial light modulator, and encode the graphic image on the second spatial light modulator.

19. The holographic projection system of claim 18, wherein the plurality of spatial light modulators comprise:

a third spatial light modulator; and a fourth spatial light modulator downstream from the first spatial light modulator, wherein the first spatial light modulator receives the first light beam, the third spatial light modulator receive the second light beam, and the control module is configured to encode at least one of a lens hologram or a prism hologram on the third spatial light modulator, and encode the graphic image on the second spatial light modulator and the fourth spatial light modulator.

* * * * *